Patented Aug. 14, 1951

2,564,522

UNITED STATES PATENT OFFICE 2,564,522

PROCESS FOR PREPARING ZIRCONIUM COMPOUNDS

Charles de Rohden, Neuilly-sur-Seine, Marcel Kastner, Beaumontel, and Maxime Paquet, Pouges-les-Eaux, France No Drawing. Application March 22, 1946, Serial No. 656,529. In France March 29, 1945

24 Claims. (Cl. 23—24)

It is known to prepare basic sulphates of zirconium, starting from zirconium ores which are first calcined in the presence of sodium carbonate, then washed with water to extract the soluble salts, and the leached product finally reacted with hydrochloric acid. After separation of the insoluble compounds, the zirconium is precipitated in the hot state from the solutions, in the form of definite basic zirconium sulphates, by adding sulphuric acid, and heating.

But in the processes heretofore described, the methods of operation enable only mediocre and insufficient outputs of manufactured products to be obtained and the zirconia produced by calcination of such basic sulphates is of poor quality.

We have now discovered, according to the present invention, that it is possible to industrially produce a new zirconium oxide compound which is practically free from iron and silicon, with an efficiency which may exceed 93%, based on the zirconia contained in the ore utilised, if the operations are carried out under certain conditions.

Accordingly, the invention comprises an aggregate process, the succession of steps of which and the manner in which each of said steps is effected enables products of good quality to be obtained with an excellent efficiency.

Said process comprises subjecting the zirconium ore to the following succession of operations:

1. Preparing a frit from the ore in the presence of sodium carbonate.
2. Directly reacting the fritted mass with hydrochloric acid of proper concentration.
3. Maturing the mass thus obtained, for several hours.
4. Dissolving the soluble part of the mass and separating the insoluble substances.
5. Hydrolysing the $ZrOCl_2$ in the solution by the addition of $SO_4$ ions in certain conditions of proportion and concentration.
6. If desired, calcination of the hydrolysis product.

The characteristics of these various steps are successively described hereinafter:

1. Preparation of the Frit

Two categories of ore may be used:

(a) Zircons or zirconium silicates, which if the ore is very pure on analysis, contain about: 65 to 66% of $ZrO_2$ and 32 to 34% of $SiO_2$.

(b) Zirkites which by analysis contain about 90% and more of $ZrO_2$ and 2 to 9% of $SiO_2$ (as these ores are extremely variable, the indications of their composition are only given indicatively).

The ore in either case is finely ground and intimately mixed with sodium carbonate in the following proportions:

(a) For each 10 kg. of zircon (having a 65–66% $ZrO_2$ content in the ore), 6.1 kg. to 6.9 kg. of $Na_2CO_3$ are added, thereby giving an excess of sodium carbonate of between 5 and 16% over the quantity theoretically required to form the compound corresponding to the formula:

$$Na_2SiZrO_5$$

(b) For each 10 kg. of zirkite (having a 90–92% $ZrO_2$ content) in the ore are added from 8 to 9.2 kg. of $Na_2CO_3$.

It is obvious that for ores of intermediate composition, the quantities of sodium carbonate are suitably adjusted.

The intimate mixture is fritted by known means at about 950° to 1000° C., for a sufficient time for the reaction to be practically complete.

We have discovered that by operating in the manner just described, 97% and more of the zirconia contained in the ore are made soluble under the conditions of reaction which are given hereinafter, that is to say in hydrochloric acid of densities of between 1.11 and 1.15 specific gravity (between 15° and 19° Baumé, i. e. hydrochloric acid of about 23.3% to 30.2%).

It is known to prepare a frit with zircon and  sodium carbonate, but the proportion of the sodium carbonate used has usually been much larger; we have discovered, according to the invention, that not only does this not increase the efficiency in the present process but, on the contrary, makes it considerably less economical (larger quantity of sodium carbonate and increased expenditure of hydrochloric acid).

If the amount of sodium carbonate used is below the lower figure mentioned, the reaction is incomplete, and the output of solubilised zirconia rapidly decreases.

2. Reacting the Fritted Mass

After having been ground if necessary, the fritted mass is reacted with hydrochloric acid diluted with water to between 23.3% and 30.2%, in the following conditions: the crushed frit mass should be poured quickly into the acid and well mixed therewith.

The quantity of HCl used, is the theoretical quantity required to convert all the $ZrO_2$ into $ZrOCl_2$ and all the $Na_2O$ into NaCl; plus a slight excess namely an excess of between 1 and 6% of such HCl.

The reacting of the fritted mass is effected with a commercial hydrochloric acid to which is added the necessary water to obtain a density of between 15 and 19° Baumé (i. e. 23.3% to 30.2% strength), in accordance with what will be explained hereinafter.

The choice of the density (concentration) of the acid is important; upon it depend the results of the reaction; it is chosen in accordance with the following technical observations:

(a) The beginning of the reaction, during which the mixture which is first liquid, then thickens, should last from 4 to 10 minutes counted from the mixing operation.

(b) The maximum temperature of the reaction mass, which is given by the exothermic reaction that occurs, should be between 85° and 105° C.

(c) A few hours after the reaction (from 3 to 6 hours) the mass should be pasty and not solid and dry, when it is still at above 60° C.

These three considerations are important; upon them depend the efficiency, the ease of filtration and of operation, and the quality of the product.

If the reaction is too quick (less than 4 minutes), if the temperature of the mass is too high (over 105° C.), if the mass will have become solid and dry after a few hours, it is because the acid concentration is too high; furthermore, the use of too concentrated an acid may cause the mass to set hard in a few minutes and thus appreciable quantities of the partially fused mass may be protected and remain incompletely reacted with the HCl, thereby decreasing the efficiency; finally, the product of the reaction becomes less readily soluble in water and is often incompletely soluble.

If the temperature of the reaction is too high, sometimes froth forms and overflowing occurs and a substantial loss of HCl and of water occurs by vaporisation, which decreases the efficiency and upsets the sequence of the operations.

On the other hand, if the acid is too dilute, the reaction is too slow; the insolubilisation of the silica is incomplete even with the maturing which will be referred to hereinafter; the mass washed with water gives a solution containing colloids producing hydrolysed products which are difficult to wash out so that the elimination of the iron, the silica and the sodium salts would be incomplete, and products of inferior quality would be produced.

3. MATURING OF THE REACTION MASS AND INSOLUBILISATION OF THE SILICA

The insolubilisation of the silica in the above mentioned conditions of reaction with hydrochloric acid is due to a maturing effect. It is obtained by allowing the mass to stand, after the reaction, for at least 4 hours and preferably at least 6 hours; preferably the temperature will be maintained throughout this time between 50° C. and 100° C. This maturing is of capital importance; it permits, in the conditions of the reaction, of practically the total elimination of the silica and of the complete destruction of the colloids, so that the solutions and subsequently the products of hydrolysis can be readily filtered, thus enabling the impurities (ferric chloride-sodium salts) to be completely eliminated; the absence of colloids gives products of hydrolysis capable of yielding by calcination zirconias which are tender, soft to the touch, and having great opacifying and covering power, whereas in the presence of colloids, the zirconia obtained is hard and of poor quality.

4. DISSOLVING THE ZIRCONIUM AND THE SODIUM CHLORIDES; SEPARATION OF THE SILICA AND OF THE UNREACTED SUBSTANCES

We have discovered, according to the present invention, that the reaction mass obtained by the operations hereinbefore described, after maturing for preferably 6 hours in the conditions of temperature above referred to, should be dissolved in the requisite quantity of water added at ordinary temperature to obtain a solution having a $ZrO_2$ content of about 85 gr. per litre; the temperature of the matured mass is sufficient (if the operation is performed on masses exceeding 30 kg. and if the mass is dissolved with water immediately after maturing) for solution to take place completely and quickly, without the application of additional heat, which is an important fact industrially, since the heating of hydrochloric acid solutions is costly and difficult to effect.

The temperature of the solution thus prepared may advantageously be between 40° and 50° C.

When obtained in the above conditions, the solutions can be filtered readily and the washing out of the silica and of the residues of the reaction is quick and thorough.

The solutions are limpid and free from colloids, they do not require any clarifying before the hydrolysis, a fact which is of great importance.

We have found that:

(a) If the preparation of the frit has been suitably carried out, which is neither complicated, nor difficult, over 95% (in practice at least 97%) of the zirconia of the ore has gone into the solution which in that case contains:

|  | Gr. per litre | Chemical ratio |
|---|---|---|
| $ZrO_2$ | approx. 85 | 1 atom Zr. |
| Acidity expressed in Cl | 50 | 2.1 atoms Cl. |
| Total Cl | 101 | 4.2 atoms Cl. |
| NaCl | 85 to 90 | 2.1 to 2.3 molecules. |

(b) The solution is practically free from dissolved silica: (less than 0.2 gr. per litre and often 0.1 gr. per litre and even less.

(c) The whole of the sodium is in the solution in the form of sodium chloride.

(d) The ratio of atoms of chlorine (not combined with the sodium) to atoms of zirconium present in the solution is between 1.8 and 2.2., preferably between 2 and 2.1.

The chlorine in the solution which is not combined with the sodium, we call "active chlorine," for a brief definitive term.

5. HYDROLYSIS

We have discovered, on the other hand, that in order to obtain satisfactory results both as regards the quality of the product obtained and the efficiency of the operation, it is necessary to effect the separation of the zerconia by hydrolysis, which hydrolysis is effected, in accordance with the invention, under the following conditions:

(a) In the solution, the atomic ratio of the active chlorine (Cl not combined with sodium) to the zirconium should be close to 2, preferably between 1.8 and 2.2, and best between 1.9 and 2.1. If it differs much from that figure, the solution should be corrected by adding acid or sodium carbonate.

(b) The presence of sodium chloride in considerable quantities in the solution is advantageous, it improves the composition of the hydrolysis product which, from basic sulphate, is converted into a compound in which the dominant component is hydrated zirconium oxide of a physical texture which is suitable for the development of the opacifying power of the zirconia obtained by calcination of said hydrolysis product. For 1 molecule of $ZrO_2$ (in combined form in the solution to be subjected to hydrolysis) the quantity of NaCl may advantageously be between 2 and 2.5 molecules.

(c) The hydrolysis should be effected in the presence of $SO_4$ ions in the proportion of 0.45 to 0.65 molecule, and preferably 0.54 to 0.56 molecule of $SO_6$ to 1 molecule of $ZrO_2$.

Below 0.50 molecule, the output of hydrolyzed zirconia decreases slowly but the quality deteriorates quickly, the product of the hydrolysis becoming more and more colloidal and difficult to filter.

Above 0.58 molecule, the output falls off rapidly.

(d) The hydrolysis should be effected in a solution which, after the addition of $SO_4$ ions, should contain only a little acid in addition to that combined with two valences of zirconium, any increase in the acidity causing the output of hydrolysed zirconia to fall off rapidly.

(e) It is advantageous to supply the $SO_4$ ions in the form of soluble sulphates as specified in the concurrently filed application of the same inventors, Ser. No. 656,530, now abandoned.

The sulphates in question may be dissolved in water and the solution added to the hydrochloric acid solution of zirconium (see Example 3).

We have also discovered that the addition of soluble sulphate or sulphates already formed can be replaced by the formation of said sulphate or sulphates in the solution itself. To this end, the necessary quantity of concentrated or dilute sulphuric acid to obtain the desired $SO_4/ZrO_2$ ratio is added to the cold solution, then the necessary quantity of sodium carbonate or caustic soda or magnesium carbonate or alumina or the like, is added, to convert the whole of said sulphuric acid into sulphate. It has been found that this method is practical and produces satisfactory results; the addition of the bases in requisite quantities does not cause any precipitation of zirconia and the solution remains clear and ready for the hydrolysis if the acid is added first.

(f) We have discovered, on the other hand, that it is advantageous to effect the hydrolysis at a $ZrO_2$ concentration of between 40 and 60 gr. per litre and preferably between 40 and 50.

The efficiency of the hydrolysis is further increased and may even exceed 98% of the $ZrO_2$ present, by diluting the hydrolysis suspensions as soon as the hydrolysis is completed by the further addition of cold water in the proportion of 1 to 2 or 2 to 3 volumes of water to each volume of the solution. A greater dilution has no further good effect on the efficiency. This cold water quickly cools the liquor.

(g) The hydrolysis is effected preferably by heating to boiling point for 2 hours.

The quantity of the hydrolysis product is enhanced by effecting the hydrolysis by bubbling steam through the solution which should preferably contain initially, 75 to 85 grams of $ZrO_2$ (in combined form) per litre, and the bubbling of steam is continued until the volume of the suspension has become, by condensation of steam, such that it contains 40 to 50 gr. of $ZrO_2$ per litre.

(h) We have found that the addition to the solution, before or during the hydrolysis, of a small quantity of alkali bisulphite solution improves the quality of the zirconia produced, producing a quicker and more complete elimination of the iron from the precipitate, by washing the latter, (the iron having been completely reduced to the ferrous condition, by the sulphur dioxide liberated from the bisulphite).

The experiments made have led to the conclusion that two methods of hydrolysis may be used for obtaining, by appropriate calcination of the products of the hydrolysis, good quality zirconias (perfect whiteness—soft to the touch—great opacifying and covering power) which products only differ from one another by different mean apparent densities.

The first yields zirconias having apparent densities of between 1.1 and 1.3; whereas the second yields zirconias having apparent densities of between 0.8 and 1.

*First method*

To the solution of $ZrO_2$ compound obtained as described above, is added the necessary quantity of soluble sulphate to supply the $SO_4$ ions, the solution is diluted to 40 to 45 gr. per litre of $ZrO_2$ and then brought to boiling point for 2 hours. As stated above, the dilution and hydrolysis may be produced by bubbling steam through the solution.

When the hydrolysis is completed, the volume of the suspension is diluted with 2 volumes of cold water, the suspension is allowed to settle, the precipitate is washed by three decantations and finally filtered and washed on the filter.

The product of hydrolysis is dried and then calcined at about 900° C. to 1000° C. until a pH of 6.8 to 7.2 is obtained in the zirconia produced. The zirconia is perfectliy white, tender, soft to the touch and has an apparent density of between 1.1 and 1.3.

*Second method*

Take on the one hand a known volume of the solution to be hydrolysed (85 gr. per litre of $ZrO_2$). On the other hand take the same volume of a solution of soluble sulphate containing the necessary quantity of $SO_4$ ions (i. e. 0.55 mol of $SO_4$ to 1 molecule of $ZrO_2$).

This sulphate solution is raised to its boiling point, then the whole of the hydrochloric solution of $ZrO_2$ to be hydrolysed, which has preferably been previously heated to about 70 to 80° C. is added in a few minutes. The mixture is raised to boiling point for 1 to 2 hours.

Allow to settle, wash and filter as in the first method.

The hydrolysis product, when dried and calcined, yields a zirconia of good quality having an apparent density of between 0.8 and 1.

6. CALCINATION OF THE PRODUCTS OF HYDROLYSIS

The hydrolysis products obtained may be calcined by the method described hereunder:

(a) Either directly after a more or less thorough drying, a comparatively large amount of $SO_3$—$SO_2$ is thus driven off during the calcination (more than 300 gr. of $SO_3$—$SO_2$ per kg. of $ZrO_2$ manufactured).

(b) Or after partial neutralisation of the hydrolysis product, for this purpose, after washing, dilute alkaline solutions (soda, ammonia, etc.) are added so as to obtain a pH of about 6.5. After this neutralising operation, the product is again washed to completely eliminate the soluble sulphates formed.

The neutralisation forms a practical means of decreasing the quantities of $SO_3$ and $SO_2$ issuing from the furnace during the calcination.

The calcination of the hydrolysis products is effected at about 900° C. to 1000° C. for the necessary time to drive out the total of the $SO_3$ content of the washed precipitate, i. e. until the pH of the zirconia is between 6.8 and 7.2.

The following numerical examples show in what manner the application of the present invention may be effected.

EXAMPLE 1

(a) With 30 kg. of ground zircon (65 to 66% $ZrO_2$) are intimately mixed 19.5 kg. of anhydrous sodium carbonate: the mixture is fritted by the known means.

42 kg. of fritted mass is obtained containing about 48 to 60% of $ZrO_2$ of which about 97% can be reacted with dilute hydrochloric acid in the conditions hereinbefore described.

(b) The 42 kg. of said mass are pulverised (if the mass is agglomerated) then poured into about 84.5 litres of hydrochloric acid of a density of 17.5° Baumé (i. e. about 96.3 kg. of HCl solution of about 27.64% strength). The mixture is stirred quickly.

About 7 minutes after this operation the mass thickens and the temperature will have risen to about 100° C.

(c) It is allowed to stand in this condition for 6 hours in order to effect the necessary maturing.

A pasty mass is thus obtained which weighs about 137 kg. and which is still at 70 to 75° C. It contains about 14.25% of $ZrO_2$ (of which about 97% are soluble in dilute hydrochloric acid), sodium chloride equivalent to 8.76% of $Na_2O$ and 7.3% of $SiO_2$. Practically all of the $SiO_2$ is in an insoluble state.

(d) The 137 kg. of reacted mass are diluted with 150 litres of water at ordinary room temperature; dissolving is quick.

The solution is filtered and produces about 200 litres of solution containing about 85 grams per litre of $ZrO_2$ and 10.8 kg. of undissolved residue which are washed with water to dissolve and recover the soluble zirconium compound contained therein. Usually about 60 litres of water, or less, will be used for this purpose. The washings may contain zirconium compounds equivalent to 1.9 kg. of $ZrO_2$ (or about 30 to 32 grams per litre, when 60 litres of water are used). This solution can be used, with water, in dissolving the next batch of the acid treated fritted ore.

In the sequence of these operations, there is thus recuperated:

17 kg. of $ZrO_2$ in the 85 gr. per litre solution.
1.8 to 1.9 kg. in the washing water for the insoluble products, i. e. a total of 96 to 97% of the $ZrO_2$ present in the ore.

The 200 litres of solution contains approximately:

| | Gr. per litre | Chemical ratio |
| --- | --- | --- |
| $ZrO_2$ | Approx. 85 | 1 atom Zr. |
| Acidity expressed in Cl | Approx. 49 to 50 | 2 to 2.1 atoms Cl. |
| Total Cl | Approx. 100 to 101 | 4.1 atoms Cl. |
| NaCl | Approx. 85 to 86 | 2.1 molecules. |

The acidity expressed in chlorine corresponds to the quantity of acid measurable by titration with a standardized solution of sodium hydroxide in the presence of phenolphthalein.

The solution furthermore contains about 0.2 gr. per litre of $SiO_2$, or even less, if the reaction with hydrochloric acid and the maturing have been suitably carried out.

The above solution, which is quite limpid and free from colloids, is ready to be hydrolysed.

The active Cl is titrated and the ratio of atoms of active chlorine to dissolved zirconium atoms is brought to approximately 2.

The hydrolysis of the solution thus obtained may be effected in the following manner:

To 50 litres of the previous solution (containing 85 gr. per litre of $ZrO_2$ and wherein the ratio of chlorine atoms to atoms of dissolved zirconium) are added 0.55 mol. of $Na_2SO_4$ per mol. of $ZrO_2$, i. e. 19 litres of a solution of $Na_2SO_4$ containing 142 gr. per litre. The necessary quantity of water is added to make up the volume to about 85 litres.

The mixture is raised to boiling point for 2 hours. After this time, the hydrolysis is practically completed.

The hot suspension is poured into 85 litres of cold water.

The solution is filtered, (i. e. the solid product of hydrolysis) and the residue washed until the iron and the NaCl are eliminated.

The yield of zirconia is 97.5% of the $ZrO_2$ present in the solution.

The hydrolysis product, dried and calcined at about 900° C. to a pH of about 6.8 yields a zirconia which is perfectly white, tender, very soft to the touch, and having a high opacifying and covering power, its apparent density is about 1.2.

EXAMPLE 2

Proceed as in the previous example to prepare the solution from which the silica and the colloids have been eliminated. Its hydrolysis is effected as follows:

To 50 litres of solution is added 0.55 mol. of $MgSO_4$ per mol. of $ZrO_2$. Thus 9.1 litres of a solution containing 250 gr. per litre of $MgSO_4$ figured as anhydrous $MgSO_4$, can be added. Then the mixture is brought to boiling point by bubbling steam through it for 2 hours until the total volume reaches about 90 to 95 litres.

The solution is allowed to cool and the precipitate settles, the mother liquor is syphoned off, then the precipitate is washed three times by decantation and finally filtered and washing on the filter is continued until the iron and the NaCl are eliminated.

The yield of the hydrolysis is 98%.

The calcined $ZrO_2$ product is dried and calcined at 900° C. (to a pH=6.8). A perfectly white zirconia is obtained, which is very tender, very soft to the touch and has a very high opacifying power. Its apparent density is about 1.15.

EXAMPLE 3

Proceed again as in Example 1 to prepare the solution from which the silica and the colloids have been eliminated. Its hydrolysis is effected as follows:

Take 50 litres of the solution made from the fritted mass and hydrochloric acid; on the other hand, make 50 litres of solution by dissolving in water: 1.35 kg. of $Na_2SO_4$+1.125 kg. of $MgSO_4$ (expressed as anhydrous salts).

Bring this latter solution to boiling point, while heating the first solution to about 75° C.

Mix these two solutions in a few minutes and continue to heat for about 2 hours.

Allow to cool, filter and wash as in Example 2.

The hydrolysis product dried and calcined at 900° C. (to a pH of 6.8) yields a zirconia which is comparable to those obtained in Examples 1 and 2, with a lower apparent density: about 0.9.

In order to clearly show the improvement obtained by producing the hydrolysis in the presence of added metal sulphates (instead of sulphuric acid), a comparative example of the results obtained in the two cases is given hereunder:

A solution prepared as described above contained:

|  | Gr. per litre | Chemical ratio |
| --- | --- | --- |
| $ZrO_2$ | 79.2 | 1 Mol. |
| Acidity expressed in Cl | 45.5 | 2 atoms. |
| Total Cl | 125 | 5.4 atoms. |
| NaCl | 128 | 3.4 Mols. |

To samples of this solution, were added in the cold state a solution of sulphuric acid or of soluble metal sulphates, as indicated hereinafter.

The $ZrO_2$ concentration was lowered by diluting to 47.5 gr. per litre and the solution was hydrolyzed by boiling for 3 hours.

After cooling, the precipitated zirconia was separated from the mother liquor.

The following table sums up the results obtained.

|  | Nature of the added $SO_4$ ion | | |
| --- | --- | --- | --- |
|  | Sulphuric Acid | $Na_2SO_4$ | $MgSO_4$ |
| $SO_3/ZrO_2$ in molecules in the best conditions | 0.57 | 0.58 | 0.57 |
| Concentration before hydrolysis $ZrO_2$ gr. per l | 47.5 | 47.5 | 47.5 |
| Concentration after hydrolysis $ZrO_2$ gr. per Litre | 3.27 | 1.5 | 1.56 |
| Efficiency | 0.931 | 0.968 | 0.967 |

It will be seen that the substitution of soluble metal sulphates for sulphuric acid has the effect of reducing to less than one half the zirconia lost in the motor liquor of hydrolysis.

The invention includes, by way of new industrial products on the one hand the hydrolysis products obtained by means of the above described fifth step of the process according to the invention and, on the other hand the zirconia finally obtained by calcination of said hydrolysis products. These products have the following particular characteristics which enable them to be distinguished from the similar products known heretofore.

A. The products of the hydrolysis which is effected in accordance with the above described fifth step of the process according to the invention, are totally different from the crystalline basic sulphates which have been described heretofore and which are all well defined compounds. Their main characteristics are as follows:

1. The hydrolysis products obtained are amorphous and are not definite compounds; the ratio $SO_3/ZrO_2$ varies within the limits of the process in a parallel manner to the ratio $SO_3/ZrO_2$ present in the solution before hydrolysis. From 80 to 92% of the $SO_3$ present goes into the hydrolysis product, whereas the remainder is substantially to be found, one half in the mother liquor of the hydrolysis and the other half in the washing water of the hydrolysis product.

2. The hydrolysis products obtained have been found by analysis to have chemical compositions included within the following limits:

Per cent
Dried for 3 hours at 100° C.: $H_2O$ _____ 5 to 15
Dried for 3 hours at 300° C.: $H_2O$ _____ 0 to 1

The limits of these compositions are quite different from those of the basic sulphates described prior to the present invention.

$7ZrO_2, 3SO_3, 14H_2O = ZrO_2$—63.6% approx.
$SO_3$—17.7% approx.
$H_2O$—18.7% approx.
$5ZrO_2, 3SO_3, 13H_2O = ZrO_2$—36.5% approx.
$SO_3$—22.1% approx.
$H_2O$—21.4% approx.
$5ZrO_2, 2SO_3, 14H_2O = ZrO_2$—60% approx.
$SO_3$—15.6% approx.
$H_2O$—24.4% approx.

The hydrolysis products, examined under X-rays do not produce any line diagram: they are amorphous.

This proves:

(a) That they are composed for the major part of hydrated zirconia and not of crystalline basic sulphates.

(b) That the greater part of the $SO_3$ contained in the solid hydrolysis product is adsorbed by the latter and not combined with zirconia.

B. The zirconias obtained by calcination of the product of hydrolysis until the product has a pH between 6.8 and 7.2 in an oxidising medium at about 900° C. are perfectly white, tender, soft to the touch and have exceptional opacifying and covering properties, their apparent densities are between 0.8 and 1.3.

They are practically pure.

Their chemical compositions are included within the following limits:

$ZrO_2 + TiO_2$ _____ 99.2 to 99.6
$SiO_2$ _____ 0.05 to 0.1
Fe _____ 0.02 approx.
$Na_2O$ _____ 0.3 to 0.6

The $TiO_2$ content may vary within certain limits, depending on the $TiO_2$ content of the ore. Above a minimum of $TiO_2$ contained in the ore, the quantities of $TiO_2$ found in the mother liquor of hydrolysis are substantially constant so that if the physical selection of the zircon (or ore) only leaves therein quantities of $TiO_2$ which are less than 0.2%, the $TiO_2$ content of the hydrolysis products becomes very low.

We claim:

1. A process of industrially preparing pure zirconium compounds from zirconium ores, which comprises preparing a frit from said ore and an amount of sodium carbonate which is between 5% and 15% in excess of the theoretically required amount of such carbonate to convert all the zirconium silicate present into $Na_2ZrSiO_5$ and all the $ZrO_2$ present into $Na_2ZrO_3$, by heating such mixture of said ore and sodium carbonate to between about 950° C. and about 1000° C., reacting on the whole of said fritted material in a comminuted condition, with hydrochloric acid of between 15° and 19° Bé., in such proportions as to convert all the zirconium in the frit into $ZrOCl_2$ and to convert all the sodium in the frit into NaCl and with an excess of 1 to 6% HCl; allowing the mixture to mature for at least about 4 hours, at a temperature between 50° C. and 100° C., to produce insolubilization of the silica and to destroy colloids therein, under such conditions as to leave a pasty mass; adding sufficient water to dissolve substantially the whole of the zirconium and sodium compounds, the amount of such water being such as to give a solution containing zirconium compounds equivalent to about 85 grams of $ZrO_2$ per litre, and separating the insoluble matter from the solution; bringing the atomic ratio of active chlorine to dissolved zirconium in the solution to between 1.9 and 2.1; adding a readily soluble sulphate to such solution in amount sufficient to give $SO_4$ ions in the proportion of about 0.50 to about 0.58 molecular equivalents of sulfate radical per mol. of $ZrO_2$ in combined form in such solution, while maintaining the total free acidity in the solution not substantially above that which corresponds to saturation of two valencies of the zirconium present in the solution, and adding water to said solution in such proportion as to bring the concentration of the $ZrO_2$ in the solution to between 40 and 60 grams per litre; and effecting hydrolysis of the zirconium compound in the solution, such hydrolyzing step being conducted at a temperature near the boiling point of the said solution; and separating the insoluble product of such hydrolysis.

2. In a process for preparing zirconium compounds according to claim 1, and in the step of preparing a frit from the ore, the improvement which consists in adding for each 10 kg. of zircon, from 6.1 kg. to 6.9 kg. of sodium carbonate and for each 10 kg. of zirkite, from 8 kg. to 9.2 kg. of sodium carbonate, and then fritting the mixture.

3. In the process as covered in claim 1, the improvement which consists in maturing the reaction product of hydrochloric acid upon the fritted mass, by holding the same at temperatures between 50° C. and 100° C., for at least about 4 hours, and only then diluting same with water while keeping the temperature of the mixture at about 40 to 50° C., and the proportions of such matured mixture and water being such as to give a solution containing about 85 grams of $ZrO_2$ in dissolved form, per liter, whereby the silica derived from the fritted mass is insolubilized and the colloids in the initial solution are destroyed, and separating the clear solution containing not substantially over 0.2 gram of silica per liter, from the insolubles.

4. In a process for preparing zirconium compounds according to claim 1, the step which consists in conducting the hydrolysis in a solution which contains such a quantity of sodium chloride that the ratio expressed in $$\frac{NaCl}{ZrO_2}$$

molecules is between 2 and 2.5.

5. In the process of claim 1, the step of effecting the said hydrolysis operation in a liquor containing in solution at the commencement of the said operation, between 0.54 and 0.56 molecular equivalents of $SO_4$ ions to 1 molecular equivalent of $ZrO_2$.

6. In the process of claim 1, the step of effecting the hydrolysis step at close to the boiling point of the solution, continued for about 1 to 2 hours.

7. In the process according to claim 1, the step of diluting the solution to be hydrolyzed, to a concentration of about 30 to 60 grams of $ZrO_2$ per liter.

8. In the process according to claim 1, the step of diluting the solution to be hydrolyzed, to a concentration of about 40 to 50 grams of $ZrO_2$ per liter.

9. In the process according to claim 1, the improvement which consists in effecting the hydrolysis of zirconium compounds in solution, by introducing steam into the said solution in amount sufficient to bring the concentration, figured as $ZrO_2$, from about 85 grams per liter to between 30 and 60 grams per liter.

10. In the process according to claim 1, the improvement which consists in effecting the hydrolysis of zirconium compounds in solution, by introducing steam into the said solution in amount sufficient to bring the concentration, figured as $ZrO_2$, from about 85 grams per liter to between 40 and 50 grams per liter.

11. In a process for preparing zirconium compounds according to claim 1, the step which consists in producing the hydrolysis by adding $SO_4$ ions in a proportion of between 0.45 and 0.65 molecules of $SO_4$ to 1 molecule of $ZrO_2$, and also adding a small quantity of a substance containing the sulphite ion.

12. In a process for preparing zirconium compounds according to claim 1, the step which consists in producing the hydrolysis by adding $SO_4$ ions in a proportion of between 0.54 and 0.56 molecular proportions of $SO_4$ to each molecule of $ZrO_2$, and also adding a small quantity of sulphite ion.

13. Process for preparing zirconium compounds, which comprises, starting from the zirconium ore, the following succession of operations: (1) preparing a frit from the ore by heating to about 950° C. to 1000° C., together with sodium carbonate; (2) reacting on the whole of the fritted mass with hydrochloric acid in amount capable of reacting upon all of the $ZrO_2$ and $Na_2O$ therein; (3) allowing the mass obtained by the reaction with hydrochloric acid to mature at between 50° C. and 100° C. for several hours, which operation produces the insolubilization of the silica and the destruction of the colloids; (4) diluting the mass by adding a sufficient quantity of water to bring the $ZrO_2$ concentration in the solution to about 85 gr. per litre and separating the insoluble substances from the solution; (5) hydrolyzing the solution by the addition of $SO_4$ ions and heating to about the boiling point for about 1 to 2 hours, while diluting the solution, and during such hydrolysis adding a soluble salt containing the sulphite ion; separating the hydrolysis product, which is composed of insoluble hydrated zirconia, washing said hydrolysis product with a dilute alkaline solution until its pH is about 6.5; then washing with water to eliminate the soluble sulphates formed; and finally calcining the washed product at about 900° C.

14. A process of preparing industrially pure zirconium compounds from a zirconium ore which contains substantially more than 10% of silica in combined condition, which comprises preparing a frit from such an ore and an amount of sodium carbonate which is between 5% and 15% in excess of the amount theoretically required to react with the $ZrO_2$ and $SiO_2$ contents of the ore, and heating such mixture to between about 950° C. and 1,000° C., reacting upon the whole of said fritted material in a comminuted condition with hydrochloric acid of between 23.3% and 30.2% strength, in such proportion as to convert all the zirconium into $ZrOCl_2$ and to convert all the sodium into NaCl, and with an excess of about 1% to 6% HCl, allowing the mixture to mature at between 50° and 100° C., for at least about 4 hours, to effect substantially complete insolubilization of the silica and to destroy colloids therein, and to leave a pasty mass, mixing the said pasty mass with sufficient water to dissolve zirconium compounds and sodium compounds, and to leave a solution containing about 85 grams of zirconium compounds, calculated as $ZrO_2$, per liter, and separating the insoluble matter from the solution, bringing the atomic ratio of active chlorin to dissolved zirconium in the solution to between 1.9 and 2.1, adding a readily soluble sulphate to such solution in amount sufficient to give $SO_4$ ions in the proportion of about 0.50 to about 0.58 molecular equivalents of sulfate radical per mol. of $ZrO_2$ in combined form in such solution, while maintaining the total free acidity in the solution not substantially above that which corresponds to saturation of two valencies of the zirconium present in the solution, and adding water to said solution in such proportion as to bring the concentration of the $ZrO_2$ in the solution to between 40 and 60 grams per liter, and then effecting hydrolysis of the zirconium compound in the solution, such hydrolyzing step being conducted at a temperature near the boiling point of the said solution, and separating the insoluble product of the hydrolysis.

15. In the hydrolysis of a hydrochloric acid solution of a zirconium compound which solution contains in solution the chemical equivalent of about 40 to about 60 grams of $ZrO_2$ per litre, and in which the atomic ratio of active chlorine to dissolved zirconium in the solution is between 1.8 and 2.2, the step of effecting the hydrolysis in the presence of $SO_4$ ions introduced into the solution in a molecular proportion to $ZrO_2$ between 0.45 and 0.65, such $SO_4$ ions being present in the form of a readily water soluble metal sulphate which does not produce any insoluble salt of the metal of such sulphate in said solution, and subjecting the zirconium compound in such solution to hydrolysis by heating.

16. Process as in claim 15, in which the $SO_4/ZrO_2$ ratio in such solution is between 0.54 and 0.56.

17. Process as in claim 15, in which the water soluble metal sulphate is produced in the solution to be hydrolyzed, by first adding sulphuric acid and then neutralizing at least a major part of such sulphuric acid in situ by adding a basic material which can combine with such acid to produce a neutral readily water soluble sulphate.

18. A process according to claim 15, in which the sulphate added is one selected from the group consisting of sodium, magnesium, aluminum, ammonium and zirconium.

19. In the process of claim 15, the herein described improvement which comprises the steps of heating the hydrochloric acid solution of the zirconium compound to between 70° and 80° C., heating the solution of water soluble metal sulphate to boiling, mixing the said solutions together at such temperatures, and then maintaining such mixed solution at close to its boiling point for about 1 to about 2 hours.

20. In the hydrolysis of a hydrochloric acid solution of a zirconium compound which solution contains in solution the chemical equivalent of about 40 to about 60 grams of $ZrO_2$ per litre, and in which the atomic ratio of active chlorine to dissolved zirconium in the solution is between 1.8 and 2.2, which solution also contains a substantial amount of sodium chloride, the step of introducing into such solution $SO_4$ ions in a molecular proportion to the $ZrO_2$ in the solution between 0.45 to 0.65, such $SO_4$ ions being introduced in the form of a readily water soluble metal sulphate which does not produce any insoluble salt of the metal of such sulphate in said solution, and subjecting the zirconium compound in such solution to hydrolysis.

21. In the process of producing $ZrO_2$ in hydrous precipitated form by hydrolysis which comprises treating the solution produced by fritting zirconium ore with sodium carbonate and reacting upon the frit with a small excess of hydrochloric acid; allowing the mass to mature for at least four hours at a temperature of about 50° C. to 100° C.; diluting with water and removing the insoluble material from the solution, and hydrolyzing the zirconium compound, the improvement which comprises adjusting the solution by the addition of a proper quantity of a neutralizing agent and diluent so that the atomic ratio of active chloride to dissolved zirconium in the solution is between 1.8 and 2.2 and the concentration of $ZrO_2$ is between 40 g. and 60 g. per litre; introducing into such solution $SO_4$ ions in a molecular proportion to $ZrO_2$ between 0.45 and 0.65, such $SO_4$ ions being introduced in the form of a readily water soluble metal sulphate which does not produce insoluble salts of the metal of said metal sulphate, in said solution.

22. Process for preparing zirconium compounds, which comprises, starting from the zirconium ore containing substantially above 10% of $SiO_2$, the following succession of operations: (1) preparing a frit from the ore at about 950° C. to 1000° C., in the presence of sodium carbonate added in an amount slightly in excess of the amount theoretically necessary for reacting with all of the zirconia and silica present in the ore; (2) reacting upon the whole of the fritted mass with hydrochloric acid; (3) allowing the mass obtained by the reaction with hydrochloric acid to mature for several hours at 50 to 100° C., which operation produces the insolubilization of the silica and the destruction of the colloids; (4) treating the mass by adding a sufficient quantity of water to produce a solution containing dissolved zirconium compound equivalent to about 85 grams of $ZrO_2$ per litre of solution, and separating the insoluble substances from said solution; (5) hydrolyzing the zirconium compounds in such solution by adding thereto a readily water soluble sulphate and heating the solution containing such zirconium compounds to about the boiling point for about 1 to 2 hours, while diluting the solution, such added sulphate being incapable of reacting upon any component of the solution to produce an insoluble sulphate, and (6) separating the hydrolysis product, which is composed of insoluble hydrated zirconia, (7) said hydrolysis product being subjected to a calcination at about 900° C. in order to eliminate the sulphate ions which it contains.

23. In the process of producing $ZrO_2$ in hydrous precipitated form by hydrolysis, the improvement which comprises fritting a zirconium ore with sodium carbonate in an excess of about 5% to about 15% over the theoretical amount necessary to combine with all of the zirconium and all of the silica in said ore, such fritting being carried on at about 950° C. to about 1000° C.; reacting upon the whole of the fritted material with hydrochloric acid in an amount sufficient to convert the zirconia into $ZrOCl_2$ and to convert the soda into NaCl, with an excess of about 1% to about 6%; allowing the reaction product to mature at 50° C. to 100° C. for at least about 4 hours; dissolving the soluble part of the matured mass in water and removing the insoluble material from the solution; adding a readily water soluble metal sulphate to such solution, which sulphate is incapable of substantially increasing the acidity of the solution and incapable of reacting with a component of the solution to form insoluble precipitates, the amount of such sulphate added being about 0.45 to 0.65 mol. of such sulphate to each mol. of $ZrO_2$ compound in the solution, and the amount of $ZrO_2$ compound in the solution, after addition of such sulphate being equivalent to about 40 to about 60 grams of $ZrO_2$ per litre, and then subjecting the zirconium compound in such solution to hydrolysis.

24. In the process of producing a solution of a zirconium compound, the improvement which comprises fritting a zirconium ore containing substantially over 10% of $SiO_2$ with sodium carbonate in an excess of about 5% to about 15% over the theoretical amount necessary to combine with all of the zirconium and all of the silica in said ore, such fritting being carried on at about 950° C. to about 1000° C.; reacting upon the whole of the fritted material with hydrochloric acid in amount sufficient to convert the zirconia into $ZrOCl_2$ and to convert the soda into NaCl, with an excess of about 1% to about 6%; allowing the reaction product to mature at 50° C. to 100° C. for at least about 4 hours; dissolving the soluble part of the matured mass in water and removing the insoluble material from the solution.

CHARLES DE ROHDEN.
MARCEL KASTNER.
MAXIME PAQUET.

REFERENCES CITED

The following references are of record in the file of this patent:

UNITED STATES PATENTS

| Number | Name | Date |
|---|---|---|
| 1,376,161 | Pugh | Apr. 26, 1921 |
| 1,454,564 | Ruff | May 8, 1923 |
| 1,582,126 | Cooper et al. | Apr. 27, 1926 |
| 1,681,195 | Rusberg et al. | Aug. 21, 1928 |
| 2,204,454 | Teichmann et al. | June 11, 1940 |
| 2,387,046 | Wainer | Oct. 16, 1945 |

OTHER REFERENCES

"Inorganic and Theoretical Chemistry," by Mellor, vol. 7 (1927), Longmans, Green and Co., pages 101–103.